United States Patent
Li et al.

(10) Patent No.: US 11,932,809 B1
(45) Date of Patent: Mar. 19, 2024

(54) CURABLE HYBRID CHEMICAL RESIN FOR SAND CONSOLIDATION

(71) Applicant: ARAMCO SERVICES COMPANY, Houston, TX (US)

(72) Inventors: Wenwen Li, Pearland, TX (US); Fakuen Frank Chang, Houston, TX (US); Feng Liang, Cypress, TX (US)

(73) Assignee: SAUDI ARABIAN OIL COMPANY, Dhahran (SA)

(*) Notice: Subject to any disclaimer, the term of this patent is extended or adjusted under 35 U.S.C. 154(b) by 0 days.

(21) Appl. No.: 17/822,826

(22) Filed: Aug. 29, 2022

(51) Int. Cl.
*C09K 8/565* (2006.01)
*E21B 33/138* (2006.01)

(52) U.S. Cl.
CPC .......... *C09K 8/565* (2013.01); *E21B 33/138* (2013.01)

(58) Field of Classification Search
None
See application file for complete search history.

(56) References Cited

U.S. PATENT DOCUMENTS

| | | | |
|---|---|---|---|
| 5,387,207 A | 2/1995 | Dyer et al. | |
| 5,500,451 A | 3/1996 | Goldman et al. | |
| 6,439,309 B1* | 8/2002 | Matherly | C09K 8/80 428/407 |
| 7,448,451 B2 | 11/2008 | Nguyen et al. | |
| 8,708,044 B2 | 4/2014 | Aston et al. | |
| 8,876,437 B2 | 11/2014 | Ballard | |
| 9,376,888 B2 | 6/2016 | Tang | |
| 2009/0192265 A1* | 7/2009 | Hasegawa | C08L 67/07 525/101 |
| 2011/0284245 A1 | 11/2011 | Crandall et al. | |
| 2017/0247296 A1* | 8/2017 | Salla | C04B 26/02 |
| 2019/0002627 A1* | 1/2019 | Becquet | C09D 175/04 |

FOREIGN PATENT DOCUMENTS

WO 2009071876 A1 6/2009

OTHER PUBLICATIONS

Lahalih et al., "Polymer Compositions for Sand Consolidation in Oil Wells," SPE 136024, Society of Chemical Engineers, Jun. 2010, 13 pages.
Alakbari et al., "Chemical Sand Consolidation: From Polymers to Nanoparticles," Polymers, May 2020, 30 pages.
Mishra et al., "Chemical Sand Consolidation: An Overview," Journal of Petroleum Engineering & Technology, vol. 5, Issue 2, 2015, 15 pages.
Tabar et al., "A Comprehensive Research in Chemical Consolidator/Stabilizer Agents on Sand Production Control," Journal of Petroleum Exploration and Production Technology (2021) 11:4305-4324, 20 pages.

* cited by examiner

*Primary Examiner* — Andrew Sue-Ako
(74) *Attorney, Agent, or Firm* — Osha Bergman Watanabe & Burton LLP

(57) ABSTRACT

A treatment fluid composition includes a carrier fluid and a curable hybrid resin. The curable hybrid resin includes a first curable resin (A) including a reactive silyl group that reacts with water downhole, a second curable resin (B), and a curing agent for the second curable resin (B). A method of treating a subterranean formation includes injecting a treatment fluid including a curable hybrid resin into a target zone of the subterranean formation. The target zone may have unconsolidated or weakly consolidated sand. The method then includes maintaining the treatment fluid in the target zone for a period of time such that the curable hybrid resin cures and forming a consolidated formation in the target zone.

17 Claims, 3 Drawing Sheets

CURABLE HYBRID CHEMICAL RESIN FOR SAND CONSOLIDATION

BACKGROUND

Many hydrocarbon-bearing formations are composed of weakly consolidated or unconsolidated sand. The drag force of produced fluid on weakly consolidated or unconsolidated formations can cause the mobilization of sand, which may lead to serious issues downhole. For example, sand production may erode downhole and surface equipment, restrict well productivity, present disposal difficulties, or completely plug a well. Accordingly, the development of effective methods to mitigate sand production has been a longstanding goal in the oil and gas industry. Often used mechanical methods include installing hardware like screens or gravel packs downhole to exclude sand grains from produced fluid, however the sand still flows with the reservoir fluid.

Chemical methods provide a more direct solution, focused on eliminating the production of sand altogether. Nonetheless, using existing chemical consolidation techniques, it is often difficult to ensure a good balance of compressive strength and permeability of the resultant consolidated formation after the treatment, ultimately hindering the well productivity. Accordingly, a chemical treatment that provides a consolidated formation having high compressive strength and permeability would be particularly valuable for use in oil and gas processes.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a treatment fluid composition including a carrier fluid and a curable hybrid resin. The curable hybrid resin may include a first curable resin (A) that includes a reactive silyl group that reacts with water downhole, a second curable resin (B), and a curing agent for the second curable resin (B).

In another aspect, embodiments disclosed herein relate to a method of treating a subterranean formation that includes injecting a treatment fluid including a curable hybrid resin into a target zone of the subterranean formation. The target zone may have unconsolidated or weakly consolidated sand. The method then includes maintaining the treatment fluid in the target zone for a period of time such that the curable hybrid resin cures and forming a consolidated formation in the target zone.

Other aspects and advantages of the claimed subject matter will be apparent from the following description and the appended claims.

DETAILED DESCRIPTION

Figure 1:
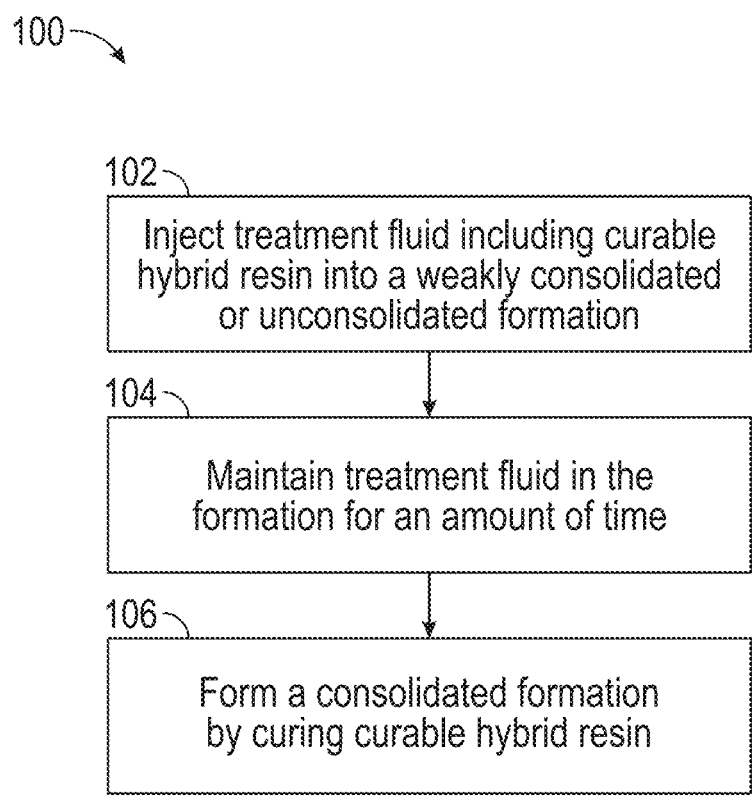
FIG. 1 is a block flow diagram of a method for treating a subterranean formation in accordance with one or more embodiments of the present disclosure.

Embodiments disclosed herein generally relate to compositions and methods for sand consolidation in subterranean formations using a treatment fluid including a curable hybrid resin. The curable hybrid resin may include a first curable resin (A), a second curable resin (B), and a curing agent for the second curable resin (B). The first curable resin (A) may include at least one reactive silyl group. Methods in accordance with some embodiments may involve injecting the treatment fluid into a target zone of a subterranean formation having weakly consolidated or unconsolidated sand and curing the curable hybrid resin such that a consolidated formation forms in the target zone.

The combination of the first curable resin (A) and the second curable resin (B) may provide a curable hybrid resin that cures under downhole conditions to provide a consolidated formation with high compressive strength while maintaining the formation permeability.

Curable Resin Composition

In one aspect, embodiments of the present disclosure relate to a treatment fluid composition for the treatment of unconsolidated or weakly consolidated subterranean formations. The treatment fluid composition may include a carrier fluid and a curable hybrid resin including two different curable resins. The curable hybrid resin may cure under downhole conditions such that it forms a consolidated formation.

In one or more embodiments, the curable hybrid resin of the treatment fluid composition includes a first curable resin (A). The first curable resin (A) may have a main chain polymer and at least one reactive silyl group. The main chain polymer is not particularly limited. Suitable main chain polymers include, but are not limited to, polyether, polyurethane, polyacrylate, polyester, polycarbonate, and combinations thereof. The at least one reactive silyl group may be a terminal reactive silyl group, such that the first curable resin (A) is a silyl-terminated polymer. In one or more embodiments, the reactive silyl group has a structure represented by formula (I), below:

$$-\text{Si } R^1{}_{3-n}R^2{}_n \qquad (I)$$

where $R^1$ represents a C1 to C20 hydrocarbon group, a C6 to C20 aryl group, a C7 to C20 aralkyl group, or a triorganosiloxy group represented by $R^0{}_3\text{SiO}-$, where each $R^0$ independently represents a C1 to C20 hydrocarbon group and may be the same as or different from one another, $R^2$ represents a hydroxyl or hydrolyzable group, and n represents 1, 2 or 3. In embodiments in which there are multiple $R^1$s, each $R^1$ may be independently the same as or different from one or more of the other $R^1$s. In embodiments in which there are multiple $R^2$ s, each $R^2$ may be independently the same as or different from one or more of the other $R^2$ s. In one or more particular embodiments, the reactive silyl group is $\text{Si}(\text{OCH}_3)_3$, $\text{Si}(\text{OCH}_2\text{CH}_3)_3$, $\text{Si}(\text{OCH}_3)_2\text{CH}_3$, or $\text{Si}(\text{OCH}_2\text{CH}_3)_2\text{CH}_3$, among others.

In other embodiments, the first curable resin (A) is a commercially available polymer that includes a terminal reactive silyl group. Suitable commercially available polymers that may be used as curable resin (A) include, but are not limited to, MS POLYIVIIER™ and Silyl™ POLYMER supplied by KANEKA; GENIOSIL® STP-E, GENIOSIL® WP, GENIOSIL® XB, GENIOSIL® XM, GENIOSIL® XT products supplied by WACKER, and combinations thereof.

The first curable resin (A) of the curable hybrid resin may have a molecular weight ranging from 200 to 50,000 g/mol. For example, the molecular weight of first curable resin (A)

may have a range having a lower limit of one of 200, 500, 1,000, 5,000, and 10,000 g/mol and an upper limit of one of 10,000, 20,000, 30,000, 40,000, and 50,000 g/mol where a value of the lower limit may be used in combination with a mathematically compatible value of the upper limit.

In one or more embodiments, the treatment fluid composition includes the first curable resin (A) in an amount ranging from 1.0 to 40 wt % (weight percent), based on the total treatment fluid formulation. Embodiment treatment fluids may include the first curable resin (A) in an amount ranging from a lower limit of one of 1.0, 2.0, 5.0, 8.0, 10, and 15 wt % to an upper limit of one of 15, 20, 25, 30, 35, and 40 wt % where a value of the lower limit may be used in combination with a mathematically compatible value of the upper limit.

In one or more embodiments, the curable hybrid resin includes a second curable resin (B). The second curable resin (B) may be an epoxy resin such as bisphenol-A-epoxy, bisphenol-F-epoxy, aliphatic epoxies, cycloaliphatic epoxies, and Novolac resins, among others. Exemplary aliphatic epoxies include ethylene glycol diglycidyl ether, propylene glycol diglycidyl ether, 1,4-butanediol diglycidyl ether, 1,6-hexanediol diglycidyl ether, neopentyl glycol diglycidyl ether, trimethylolpropane polyglycidyl ether, poly(ethylene glycol) diglycidyl ether, poly(propylene glycol) diglycidyl ether and combinations thereof. Exemplary cycloaliphatic epoxies include hydrogenated bisphenol-A-epoxy, cyclohexane dimethanol diglycidyl ether, 3,4-epoxycyclohexylmethyl-3',4'-epoxycyclohexane carboxylate, bis (3,4-epoxycyclohexylmethyl) adipate, and combinations thereof.

Treatment fluid compositions may include the second curable resin (B) in an amount ranging from 0.5 to 40 wt %, based on the total treatment fluid formulation. For example, the second curable resin may be present in the treatment fluid in an amount ranging from a lower limit of one of 0.5, 1, 2, 5, 10, and 15 wt %, and an upper limit of one of 15, 20, 25, 30, 35, and 40 wt % where a value of the lower limit may be used in combination with a mathematically compatible value of the upper limit.

In one or more embodiments, the curable hybrid resin includes a curing agent for the second curable resin (B). The curing agent may be an amine curing agent. Suitable amine curing agents include, but are not limited to, aliphatic amines such as diethylenetriamine, isophorone diamine, triethylenetetramine, tetraethylenepentamine, diproprenediamine, and diethylaminopropylamine; aromatic amines such as diaminodiphenylsulfone and diaminodiphenylmethans; tertiary and secondary amines such as N,N-dimethylpiperidine, triethylenediamine, benzyldimethylamine and (dimethylaminomethyl)phenol; imidazoles such as 2-methylimidazole and 2-ethyl-4-methylimidazole; polyetheramine; polyamides; and combinations thereof.

Treatment fluid compositions may include a curing agent for the second curable resin (B) in an amount ranging from 0.1 to 15 wt %, based on the total treatment fluid formulation. For example, the curing agent may be present in the treatment fluid in an amount ranging from a lower limit of one of 0.1, 0.5, 1.0, 1.5, 2.0, 2.5, and 5.0 wt % and an upper limit of one of 5.0, 7.5, 10, 12, 13, 14, and 15 wt % where a value of the lower limit may be used in combination with a mathematically compatible value of the upper limit.

In one or more embodiments, treatment fluid compositions include a carrier fluid. The carrier fluid may be an oil-based fluid such as crude oil, base oil, aliphatic hydrocarbons, aromatic hydrocarbons, petroleum distillate fractions such as mineral oil, kerosene, naphtha, and diesel, and combinations thereof.

In one or more embodiments, the carrier fluid is included in a treatment fluid composition in an amount ranging from 10 to 95 wt %, based on the total treatment fluid formulation. For example, the carrier fluid may be present in a treatment fluid of one or more embodiments in an amount ranging from a lower limit of one of 10, 15, 20, 30, 40, and 50 wt % to an upper limit of one of 60, 70, 80, 85, 90, and 95 wt % where a value of the lower limit may be used in combination with a mathematically compatible value of the upper limit.

Treatment fluid compositions may optionally include a catalyst to accelerate the curing of the first curable resin (A). Such catalyst may be catalytically active to facilitate the curing of the reactive silyl groups with water under downhole conditions. In some embodiments, the catalyst may be a tin catalyst such as dibutyltin diacetylacetonate, dibutyltin dilaurate, dioctyltin diacteylacetonate, dioctyltin acetoacetonate, tin octylate, tin naphthenate, and tin stearate, among others. In other embodiments, the catalyst may be a titanium catalyst such as tetrabutyl titanate, tetrapropyl titatante, and titanium tetraacetylacetonate. In yet other embodiments, the catalyst may be an amine catalyst including, but not limited to, butyl amine, octylamine, 1,8-diazabicyclo(5.4.0)undecane-7 (DBU), or salts thereof. Acidic and basic catalysts known to facilitate silanol condensation reactions may also be used. The treatment fluid may include any of the above catalysts alone or in combination.

In embodiments in which a catalyst is used to accelerate the curing of the first curable resin (A), the catalyst may be included in the treatment fluid in an amount ranging from 0.01 to 5.0 wt %, based on the total treatment fluid formulation. For example, treatment fluid compositions may include the catalyst in an amount ranging from a lower limit of one of 0.01, 0.02, 0.05, 0.1, 0.2, 0.5, and 1.0 wt % to an upper limit of one of 1.5, 2.0, 2.5, 3.0, 3.5, 4.0, 4.5, and 5.0 wt % where a value of the lower limit may be used in combination with a mathematically compatible value of the upper limit.

In one or more embodiments, treatment fluid compositions further include an adhesion promoter. An adhesion promoter may be added to the treatment fluid to promote the adhesion of a curable hybrid resin to sand grains, once cured. In order to encourage such adhesion, the adhesion promoter may be a silane coupling agent. Examples of suitable silane coupling agents that may be used as adhesion promoters include, but are not limited to, 3-aminopropyltrimethoxy silane, 3-aminopropyltriethoxy silane, N-(n-butyl)-3-aminopropyltrimethoxysilane, N-(2-aminoethyl)-3-aminopropyltrimethoxysilane, N-(2-aminoethyl)-3-aminopropylmethyldimethoxy silane, 3-aminopropylmethyldiethoxy silane, 3-glycidoxypropyltrimethoxy silane, (epoxypropoxypropyl)methyldimethoxysilane, 3-glycidoxypropyltriethoxy silane, (epoxypropoxypropyl)methyldiethoxysilane, and combinations thereof.

In embodiments in which an adhesion promoter is used to encourage the hold of the curable hybrid resin on the sand grains, the adhesion promoter may be included in the treatment fluid in an amount ranging from 0.05 to 5.0 wt %, based on the total treatment fluid formulation. For example, an adhesion promoter may be present in an embodiment treatment fluid in an amount ranging from a lower limit of one of 0.05, 0.08, 0.1, 0.2, 0.25, 0.5, 0.8, and 1.0 wt % to an upper limit of one of 1.5, 2.0, 2.5, 3.0, 3.5, 4.0, 4.5, and 5.0 wt % where a value of the lower limit may be used in combination with a mathematically compatible value of the upper limit.

Methods of Formation Consolidation

As described above, treatment fluid compositions of the present disclosure may be formulated so as to provide a curable hybrid resin that cures downhole to form a consolidated formation. Accordingly, methods disclosed herein may include injecting a treatment fluid into a subterranean formation having weakly consolidated or unconsolidated sand, and then curing the curable hybrid resin under downhole conditions such that a consolidated formation forms.

An exemplary method 100 for treating a weakly consolidated or unconsolidated subterranean formation using an embodiment treatment fluid composition is shown in, and discussed with reference to, FIG. 1. Method 100 may include providing a treatment fluid composition with a curable hybrid resin that includes a first curable resin (A), a second curable resin (B) and a curing agent for the second curable resin (B). The treatment fluid and the curable hybrid resin are as previously described. Then, the treatment fluid including the curable hybrid resin may be injected into a subterranean formation that has weakly consolidated or unconsolidated sand 102. The treatment fluid may be injected into the subterranean formation through a wellbore. In particular embodiments, the treatment fluid may be injected into the subterranean formation through coiled tubing in the wellbore.

In method 100, after being injected, the treatment fluid may be maintained in the subterranean formation for an amount of time 104. While being maintained downhole, the treatment fluid may come into contact with reservoir water. In one or more embodiments, the curable hybrid resin of the treatment fluid may react with the reservoir water such that the resin cures after the amount of time being maintained downhole. The amount of time may be sufficient for the curable hybrid resin to cure. The specific time of curing may be dependent on downhole conditions such as the reservoir water content and the downhole temperature. In one or more embodiments, it may take an amount of time ranging from 6 to 168 hours for the curable hybrid resin to cure. For example, the treatment fluid may be maintained in a formation in an amount of time ranging from a lower limit of one of 6, 10, 12, 18, 24, 36, 48, and 60 hours to an upper limit of one of 60, 72, 84, 96, 108, 120, 132, 144, 156, and 168 hours where a value of the lower limit may be used in combination with a mathematically compatible value of the upper limit.

In one or more embodiments, the subterranean formation that the treatment fluid is injected into has an elevated downhole temperature. The elevated downhole temperature may be suitable to cure the curable hybrid resin in the treatment fluid. For example, the elevated downhole temperature may range from about 75 to about 350° F. In one or more embodiments, the subterranean formation has a downhole temperature ranging from a lower limit of one of 75, 100, 125, 150, 175, and 200° F. to an upper limit of one of 200, 225, 250, 275, 300, 325, and 350° F. where a value of the lower limit may be used in combination with a mathematically compatible value of the upper limit.

After a suitable amount of time at an elevated downhole temperature while in contact with reservoir water, the curable hybrid resin may cure. The curable hybrid resin may cure on the surface of sand grains and/or in the pore space of the weakly consolidated or unconsolidated formation so as to consolidate the formation 106. Consolidated formations formed using a treatment fluid composition in accordance with the present disclosure may have a suitable compressive strength and permeability. The compressive strength and permeability of consolidated formations of one or more embodiments may be improved compared to consolidated formations formed using conventional techniques.

In one or more embodiments, a consolidated formation formed using the compositions and methods disclosed herein has a compressive strength ranging from 100 to 3,000 psi (pounds per square inch). For example, consolidated formations that have been treated with an embodiment treatment fluid including a curable hybrid resin may have a compressive strength ranging from a lower limit of one of 100, 200, 500, 1,000, and 1,200 psi to an upper limit of one of 1,000, 1,500, 2,000, 2,500, 2,800 and 3,000 psi where a value of the lower limit may be used in combination with a mathematically compatible value of the upper limit. Such compressive strength may be sufficient to reduce sand production from the subterranean formation.

In one or more embodiments, consolidated formations have a permeability such that the productivity of the formation is maintained. For example, the permeability of subterranean formations treated with treatment fluids according to the present disclosure may range from 10 mD (millidarcy) to 10 D (Darcy). Consolidated formations may have a permeability ranging from a lower limit of one of 10, 500, 1,000, 1,500, and 1,900 mD to an upper limit of one of 2.0, 5.0, 8.0, and 10 D, where a value of the lower limit may be used in combination with a mathematically compatible value of the upper limit.

Figure 2:
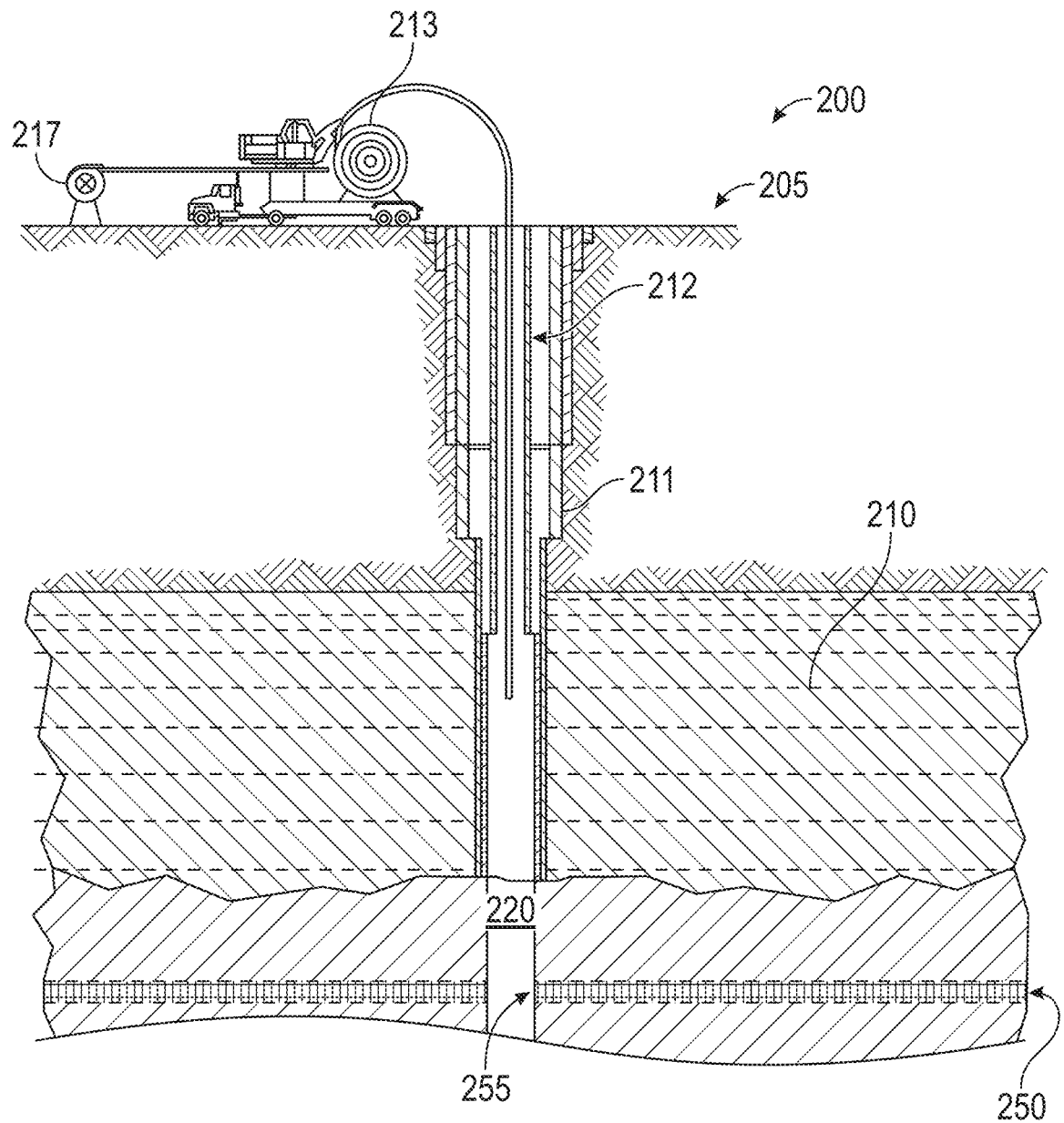
FIG. 2 is a depiction of a well environment according to one or more embodiments of the present disclosure.

FIG. 2 is a diagram that illustrates a well environment 200 in accordance with one or more embodiments. Well environment 200 includes a subsurface 210. Subsurface 210 is depicted having a wellbore wall 211 both extending downhole from a surface 205 into the subsurface 210 and defining a wellbore 220. The subsurface also includes target formation 250 containing weakly consolidated or unconsolidated sand. Target formation 250 has target formation face 255 that fluidly couples target formation 250 with wellbore 220 through wellbore wall 211. In this case, casing 212 and coiled tubing 213 extend downhole through the wellbore 220 into the subsurface 210 and towards target formation 250.

With the configuration in FIG. 2, the previously described embodiment treatment fluid that comprises a curable hybrid resin may be injected into target formation 250 via a pump 217 through the coiled tubing 213 in the wellbore 220. Wellbore 220 may be shut in, as described above, in order to maintain the treatment fluid in target formation 250 for a time suitable for the curable hybrid resin to cure and form a consolidated formation. As previously described, consolidated formations according to the present disclosure may have a higher compressive strength and permeability than consolidated formations formed by traditional methods.

EXAMPLES

KANEKA SILYL® SAX015 is a silyl-terminated polyether polymer supplied by Kaneka. D.E.R.™ 331 is a liquid epoxy resin supplied by Olin. VESTAMIN® IPD is an amine curing agent supplied by Evonik. Dynasylan® AMMO is an aminosilane-based adhesion promoter supplied by Evonik. Reaxis C226 is a dibutyltin based catalyst supplied by Reaxis. Light mineral oil was purchased from VWR.

A typical procedure for preparing inventive treatment fluids is provided below. A desired amount of SILYL® SAX015 silyl terminated polyether, DER331 liquid epoxy resin, and mineral oil carrying fluid were weighed into a plastic beaker, and then mixed with an overhead agitator at 500 rpm for 5 min to form part (A). Then, a desired amount of VESTAMIN® IPD amine curing agent, Dynasylan® AMMO adhesion promoter, and Reaxis C226 were added to part (A) and was subsequently mixed for 5 min at 500 rpm to form the treatment fluid. The compositions of Treatment Fluids 1-5 are detailed below in Table 1.

TABLE 1

Compositions of exemplary and comparative treatment fluids.

|  |  | Treatment Fluid 1 | Treatment Fluid 2 | Treatment Fluid 3 | Treatment Fluid 4 | Treatment Fluid 5 |
|---|---|---|---|---|---|---|
| Part A | SAX015 (g) | 10 | 7.5 | 5 | 3.75 | 2.5 |
|  | DER331 (g) | 0 | 2.5 | 5 | 3.75 | 2.5 |
|  | Mineral Oil (g) | 40 | 37.5 | 38.5 | 41.5 | 44.25 |
| Part B | AMMO (g) | 0 | 0.15 | 0.2 | 0.15 | 0.1 |
|  | IPDA (g) | 0.1 | 0.55 | 1.1 | 0.83 | 0.55 |
|  | Reaxis C226 (g) | 0.1 | 0.2 | 0.2 | 0.15 | 0.1 |
|  | Total (g) | 50.2 | 48.4 | 50 | 50.13 | 50 |

Water (about 0.1 g) and 100 mesh sand grains (95 g) were added to a plastic container. Then, an exemplary treatment fluid (one of Treatment Fluids 1-5) was added to the plastic container and the mixture was agitated at 500 rpm for about 5 min to form a uniform slurry. The slurry was then transferred to a test cell, and a piston was pushed into the test cell to squeeze out extra liquid (water and treatment fluid) from the slurry so that the liquid fully saturated the sand pack but there was no excess liquid outside the length or diameter of the sand pack. Additional pressure was applied to the piston using nitrogen gas (1,000 psi). The sand pack was allowed to set for 20 hours in an oven at a temperature of 200° F.

Figure 3:
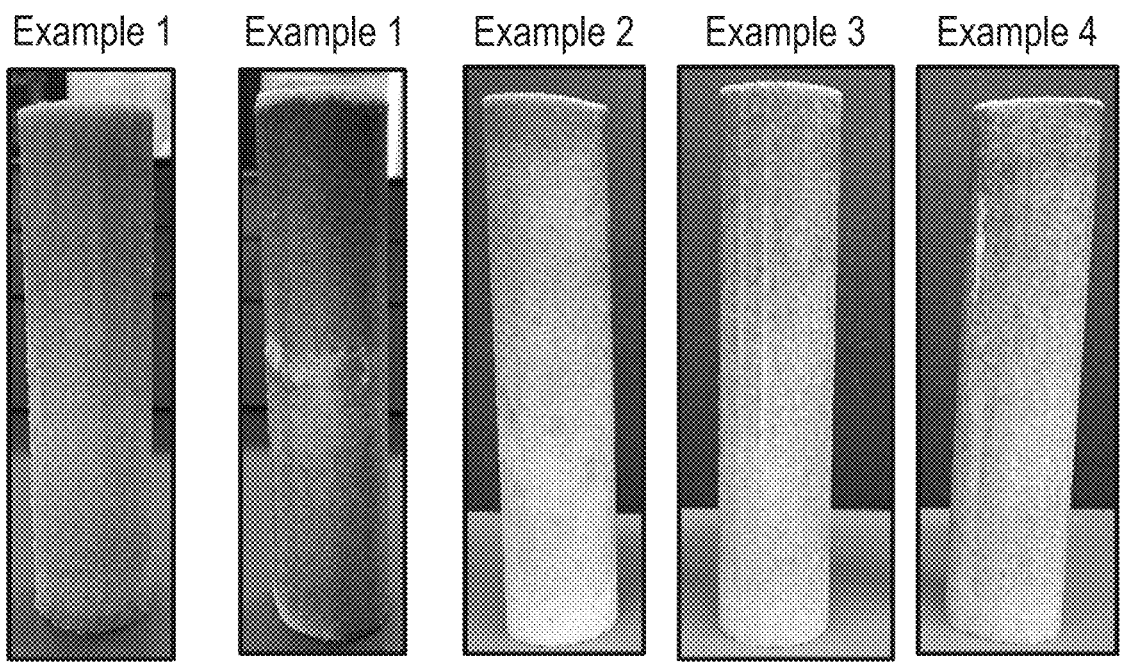
FIG. 3 is a photograph of exemplary and comparative consolidated sand in accordance with one or more embodiments of the present disclosure.

Consolidated sand packs made with Treatment Fluids 1-5, Examples 1-4 and Comparative Example 1, are shown in FIG. 3.

Each of Examples 1-4 and Comparative Example 1 were evaluated for unconfined compressive strength (UCS) and permeability. The UCS of a loose sand pack before being treated with an embodiment curable hybrid resin was 0 psi, and the permeability was 2 to 100 Darcy, depending on the sand particle size distribution, the packing process, and the density. The values measured for each exemplary sand pack (Comparative Example 1 and Examples 1-4) are provided below in Table 2.

TABLE 2

Permeability and UCS of exemplary sand packs treated with treatment fluids.

| Sample | Permeability (mD) | Compressive Strength (psi) | Curable resin amount in treatment fluid (%) | Epoxy level in curable hybrid resin (%) |
|---|---|---|---|---|
| Comparative Example 1 | 1,600* | 190 | 20 | 0 |
| Example 1 | n/a | 465 | 20 | 25 |
| Example 2 | 950 | 830 | 20 | 50 |
| Example 3 | 2065 | 640 | 15 | 50 |
| Example 4 | 2460 | 485 | 10 | 50 |

*Sample became very soft after the test

As shown in Table 2, inventive sand packs (Examples 1-4) had enhanced compressive strength compared to Comparative Example 1, which was treated with Treatment Fluid 1 that did not include any epoxy resin in the curable hybrid resin. Similarly, Examples 3 and 4 showed improved permeability compared to Comparative Example 1. Comparison of Examples 1-4 and Comparative Example 1 indicates that the "hybrid" aspect of the curable hybrid resin (i.e., the combination of a first curable resin (A) having reactive silyl groups and a second curable resin (B) that may be an epoxy resin) is crucial to the resultant properties of the sand pack.

Further, Table 2 provides insight into the effective properties of sand packs treated with treatment fluid including variable loading of a curable hybrid resin. As shown in Example 2, a higher loading (20%) of curable hybrid resin, including a high loading (50%) of epoxy resin, in the treatment fluid may lead to a sand pack having very high compressive strength, yet lower permeability. Including an even higher loading of epoxy resin in the hybrid curable resin, e.g., 75% or 100%, may provide further deteriorated permeability. Examples 3 and 4 present sand packs treated with inventive treatment fluid compositions having lower loading of curable hybrid resin (15 and 10%, respectively) and demonstrate that the curable hybrid resin amount may be tailored to provide consolidated formations with higher compressive strength or higher permeability, while sufficiently maintaining the other property. Such an effect is not seen with conventional chemical send consolidation techniques.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A treatment fluid composition comprising:
   a carrier fluid, wherein the carrier fluid is an oil-based fluid selected from the group consisting of crude oil, base oil, aliphatic hydrocarbons, aromatic hydrocarbons, kerosene, naphtha, diesel, and combinations thereof, wherein the carrier fluid is present in an amount of 40 to 95 wt % of the total treatment fluid composition; and
   a curable hybrid resin, wherein the curable hybrid resin comprises a first curable resin (A), a second curable resin (B), and a curing agent for the second curable resin (B), wherein the first curable resin (A) comprises a reactive silyl group that reacts with water downhole, wherein first curable resin (A) has a main chain polymer selected from the group consisting of polyether, polyurethane, polyacrylate, polyester, polycarbonate, or combinations thereof, and wherein the second curable resin (B) comprises an epoxy resin.

2. The treatment fluid of claim 1, wherein the reactive silyl group has a chemical structure represented by formula (I):

$$—Si\ R^1{}_{3-n}R^2{}_n \qquad (I)$$

wherein each $R^1$ is independently a C1-C20 hydrocarbon group, a C6-C20 aryl group, a C7-C20 aralkyl group, or a triorganosiloxy group represented by $R^0{}_3SiO$— wherein each $R^0$ is independently a C1-C20 hydrocarbon group;

each $R^2$ is independently a hydroxyl group or a hydrolyzable group; and n is 1, 2, or 3.

3. The treatment fluid of claim 1, wherein the first curable resin (A) has a molecular weight ranging from 200 to 50,000 g/mol.

4. The treatment fluid of claim 1, wherein the epoxy resin is selected from the group consisting of bisphenol A epoxy resin, bisphenol F epoxy resin, aliphatic epoxy resins, cycloaliphatic epoxy resins, Novolac resins, and combinations thereof.

5. The treatment fluid of claim 1, wherein the curing agent for the second curable resin (B) is an amine curing agent selected from the group consisting of diethylenetriamine, isophorone diamine, triethylenetetramine, tetraethylenepentamine, diproprenediamine diethylaminopropylamine, diaminodiphenylsulfone, diaminodiphenylmethane, N,N-dimethylpiperidine, triethylenediamine, benzyldimethylamine, 2-(dimethylaminomethyl)phenol, 2-methylimidazole, 2-ethyl-4-methylimidazole, polyetheramine, polyimide, and combinations thereof.

6. The treatment fluid of claim 1, wherein the curable hybrid resin comprises 1.0 to 40 wt % of the first curable resin (A), 0.5 to 40 wt % of the second curable resin (B), and 0.1 to 15 wt % of the curing agent for the second curable resin (B).

7. The treatment fluid of claim 1, wherein the curable hybrid resin further comprises a catalyst selected from the group consisting of dibutyltin diacetylacetonate, dibutyltin dilaurate, dioctyltin diacetylacetonate, dioctyltin acetoacetate, tin octylate, tin naphthenate, tin stearate, tetrabutyl titanate, tetrapropyl titanate, titanium tetraacetylacetonate, butylamine, octyl amine, 1,8-diazabicyclo(5.4.0)undecane-7 (DBU), and combinations thereof.

8. The treatment fluid of claim 7, wherein the catalyst is present in an amount of 0.01 to 5.0 wt % of the total treatment fluid composition.

9. The treatment fluid of claim 1, wherein the curable hybrid resin further comprises an adhesion promoter selected from the group consisting of 3-aminopropyltrimethoxysilane, 3-aminopropyltriethoxy silane, N-(n-butyl)-3-aminopropyltrimethoxysilane, N-(2-aminoethyl)-3-aminopropyltrimethoxysilane, 3-aminopropylmethyldiethoxy silane, N-(2-aminoethyl)-3-aminopropylmethyldimethoxy silane, 3-glycidoxypropyltrimethoxysilane, 3-glycidoxypropyltriethoxysilane, (epoxypropoxypropyl)methyldimethoxysilane, (epoxypropoxypropyl)methyldiethoxysilane, and combinations thereof.

10. The treatment fluid of claim 9, wherein the adhesion promoter is present in an amount of 0.05 to 5.0 wt % of the total treatment fluid composition.

11. A method of treating a subterranean formation comprising:
injecting a treatment fluid comprising a carrier fluid and a curable hybrid resin into a target zone of the subterranean formation, wherein the target zone has unconsolidated or weakly consolidated sand;
wherein the carrier fluid is an oil-based fluid selected from the group consisting of crude oil, base oil, aliphatic hydrocarbons, aromatic hydrocarbons, kerosene, naphtha, diesel, and combinations thereof, wherein the carrier fluid is present in an amount of 40 to 95 wt % of the total treatment fluid composition; and
wherein the curable hybrid resin comprises a first curable resin (A), a second curable resin (B), and a curing agent for the second curable resin (B), wherein the first curable resin (A) comprises a reactive silyl group that reacts with water downhole, wherein first curable resin (A) has a main chain polymer selected from the group consisting of polyether, polyurethane, polyacrylate, polyester, polycarbonate, or combinations thereof, and wherein the second curable resin (B) comprises an epoxy resin; and
maintaining the treatment fluid in the target zone for a period of time such that the curable hybrid resin cures; and
forming a consolidated formation in the target zone.

12. The method of claim 11, wherein the curable hybrid resin comprises:
1 to 40 wt % of the first curable resin (A);
0.5 to 40 wt % of the second curable resin (B); and
0.1 to 15 wt % of the curing agent for the second curable resin (B).

13. The method of claim 12, wherein the reactive silyl group has a chemical structure represented by formula (I):

$$—Si\ R^1{}_{3-n}R^2{}_n \qquad (I)$$

wherein each $R^1$ is independently a C1-C20 hydrocarbon group, a C6-C20 aryl group, a C7-C20 aralkyl group, or a triorganosiloxy group represented by $R^0{}_3SiO$— wherein each $R^0$ is independently a C1-C20 hydrocarbon group;

each $R^2$ is independently a hydroxyl group or a hydrolyzable group; and n is 1, 2, or 3.

14. The method of claim 13, wherein the consolidated formation has compressive strength and permeability.

15. The method of claim 11, wherein the treatment fluid is maintained in the target zone for a period of time ranging from 24 to 168 hours.

16. The method of claim 11, wherein the target zone has a downhole temperature ranging from 75 to 350° F.

17. The method of claim 11, wherein the curable hybrid resin further comprises a catalyst, an adhesion promoter, or a combination thereof.

* * * * *